(12) United States Patent
Marsh

(10) Patent No.: US 10,672,193 B2
(45) Date of Patent: Jun. 2, 2020

(54) METHODS OF RESTRICTED VIRTUAL ASSET RENDERING IN A MULTI-USER SYSTEM

(71) Applicant: DISNEY ENTERPRISES, INC., Burbank, CA (US)

(72) Inventor: K. C. (Casey) Marsh, North Hollywood, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 32 days.

(21) Appl. No.: 16/107,948

(22) Filed: Aug. 21, 2018

(65) Prior Publication Data
US 2020/0066042 A1 Feb. 27, 2020

(51) Int. Cl.
| | |
|---|---|
| G06T 19/00 | (2011.01) |
| H04N 13/344 | (2018.01) |
| G06T 17/00 | (2006.01) |
| G06T 15/80 | (2011.01) |
| G06T 15/50 | (2011.01) |
| G06Q 30/06 | (2012.01) |
| G06F 21/10 | (2013.01) |
| H04L 9/06 | (2006.01) |
| H04L 29/06 | (2006.01) |

(Continued)

(52) U.S. Cl.
CPC ............ *G06T 19/006* (2013.01); *G06F 16/51* (2019.01); *G06F 16/903* (2019.01); *G06F 21/10* (2013.01); *G06Q 30/0643* (2013.01); *G06T 15/506* (2013.01); *G06T 15/80* (2013.01); *G06T 17/00* (2013.01); *H04L 9/0637* (2013.01); *H04L 67/38* (2013.01); *H04N 13/344* (2018.05); *H04L 2209/38* (2013.01)

(58) Field of Classification Search
None
See application file for complete search history.

(56) References Cited

U.S. PATENT DOCUMENTS

| | | |
|---|---|---|
| 6,910,186 B2 | 6/2005 | Kim |
| 9,038,127 B2 | 5/2015 | Hastings |
| 9,319,357 B2 | 4/2016 | Moyers |

(Continued)

OTHER PUBLICATIONS

Oculus Blog; "Join Friends in VR with Oculus Rooms and Parties"; Oculus VR; Dec. 15, 2016; 6 pages.

(Continued)

*Primary Examiner* — Yi Wang

(57) ABSTRACT

Embodiments relate to receiving an indication of a desired item by a user in a multi-use virtual world. The indication requests a rendering of a restricted virtual object in a space of the user. A server can determine and retrieve a partially rendered model of the restricted virtual object, determine a rendering location based on position data, and link the partially rendered model to the user and to the rendering location. The partially rendered model and the rendering location can be sent to user devices for rendering the partially rendered model at the rendering location. A partially rendered appearance of the restricted virtual object indicates to a second user the desired item by a first user. A fully rendered model may contain restricted content data, whereas a partially rendered model may not contain restricted content data. The restricted content data may include a restricted digital media file.

20 Claims, 9 Drawing Sheets

S601 Receive an indication of a desired item including an item identifier and position data from first user device S602 Determine and retrieve a partially rendered model based on the item identifier S603 Determine a rendering location based on the position data S604 Link the partially-rendered model to the rendering location in database(s)

S605 Send partially-rendered model and rendering location to the first user device for rendering of unrestricted content relating to the desired item

600

(51) Int. Cl.
    *G06F 16/51*          (2019.01)
    *G06F 16/903*        (2019.01)

(56) References Cited

U.S. PATENT DOCUMENTS

| | | | |
|---|---|---|---|
| 2002/0065635 A1 | 5/2002 | Lei | |
| 2013/0042296 A1* | 2/2013 | Hastings | G06F 21/10 |
| | | | 726/1 |
| 2014/0132633 A1* | 5/2014 | Fekete | G06T 11/60 |
| | | | 345/634 |
| 2014/0149264 A1 | 5/2014 | Satyanarayana | |
| 2016/0063588 A1* | 3/2016 | Gadre | G06F 16/9554 |
| | | | 705/26.61 |
| 2017/0132625 A1* | 5/2017 | Kennedy | G06Q 20/065 |
| 2017/0316186 A1 | 11/2017 | Breitenfeld | |
| 2018/0107835 A1 | 4/2018 | Clement | |

OTHER PUBLICATIONS

VR Chat; "Create and Play in Virtual Worlds"; VRChat Inc.; May 10, 2018; 4 pages.

Bigscreen; "About Us"; Bigscreen Inc.; May 10, 2018; 4 pages.

* cited by examiner

METHODS OF RESTRICTED VIRTUAL ASSET RENDERING IN A MULTI-USER SYSTEM

BRIEF SUMMARY

One embodiment relates to a method. The method includes receiving an indication of a desired item from a device of a user. The indication requests a rendering of a restricted virtual object in a space of the user, and comprises an item identifier for the restricted virtual object, an identifier for the user, and position data for the requested location that the restricted virtual object is to be rendered. The method further includes determining and retrieving partially rendered model of the restricted virtual object based on the received indication and the item identifier. Based on the position data, a rendering location in the space of the user is determined, and the partially rendered model is linked to the user and the rendering location before sending the partially rendered model and the rendering location to the device. The Model can be seen by other user devices in a multi-user system, and its partially rendered appearance may indicate the desired item of the user. A second user can carry out a process for fully rendering the item in the space. A fully rendered model may contain restricted content, while the partially rendered model may be a model of the item wherein restricted content is absent or does not have a fully rendered and distinguishable appearance.

One embodiment is directed to a server for performing the above method. The server can include one or more electronic computing devices for providing virtual content to user devices in a multi-user system. The server can also maintain accounts of users and their associated virtual assets. In one implementation, the virtual assets can be content for a virtual reality device. In another implementation, the virtual assets can be content for an augmented reality device.

Another embodiment is related to a non-transitory computer-readable medium storing instructions executable by a user device. The instructions cause the user device to carry out the functions of displaying a space of a user, generating a preview of a restricted virtual object at a requested location in the space of the user, and receiving an indication that the restricted virtual object is a desired item by the user. Upon receiving the indication, the user device may further be caused to retrieve an item identifier for the desired item, determine position data based on the requested location in the space, and generate a request comprising the item identifier, the position data, and a user identifier of the user. The instructions further cause the user device to carry out the functions of sending the request to a server, receiving a partially rendered model of the restricted virtual object, and rendering the restricted virtual object based on the partially rendered model. The restricted virtual object may have a partially rendered appearance indicating the desired item by the user.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

Figure 1:
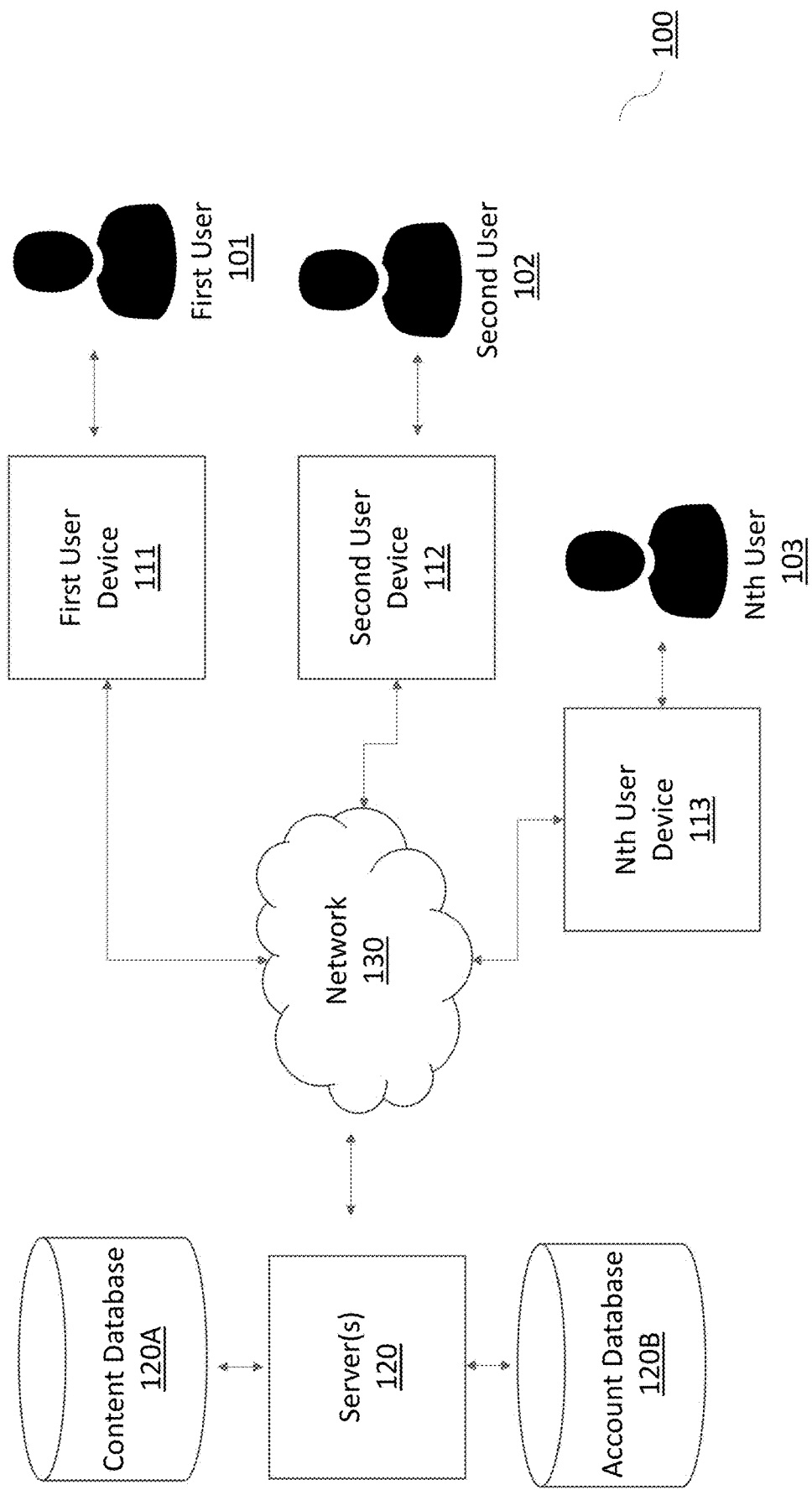
FIG. 1 shows a system diagram of a multi-user system according to embodiments.

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

BACKGROUND

In today's technological environment, virtual reality or "VR" has become an increasingly popular way for people to interact. Virtual reality typically involves a VR headset, which a user can wear and become immersed in a 360 degree virtual rendering. The user is able to interact with the virtual rendering or "virtual world" using a number of input mechanisms. This may include buttons, gestures, voice commands, etc. As such, the user is able to interact with the virtual world and its constituent virtual objects as if it were a real and physical world.

DETAILED DESCRIPTION

One technical problem that arises in the virtual world, however, is the safekeeping of virtual assets, such as in the case of illegal copying, counterfeiting, and/or pirating of copyrighted content in digital form. Another problem is the limited ability to claim and communicate ownership of virtual objects and maintain consistency between multiple VR devices running the same or similar VR experience simultaneously. For example, unlike the physical world, where each object has a singular existence, in VR, disparate devices across a network are each running an instance of the VR world and need to reconcile the current state of its constituent objects.

Embodiments described herein address these problems and others individually and collectively.

As mentioned above, virtual reality (VR) attempts to simulate or mimic the real physical world using electronic devices and computing. However, due to the digital nature of VR and the limitations of computing hardware, not all aspects of the real-world translate well to a VR environment. For example, the concept of property and ownership in VR is complicated by the distributed nature of how the VR world is rendered. When a virtual asset is rendered at a particular location, it does not exist in just one physical place, but must also be rendered for all users that enter that space and at all of their corresponding devices in a consistent manner. This can be made complicated with regards to the issue of restricted or copyrighted content and the unauthorized use thereof. At the same time, since VR is not limited to the same physical limitations as the real world, additional functionality can be provided, especially with respect to how assets can be expressed and rendered. For example, specific rendering characteristics of virtual content can be modified in order to communicate a desire for an item that may be restricted in some way (e.g., copyrighted material that is only available upon purchase). Similar techniques can also be applied to augmented reality. Embodiments described herein are related to the rendering of virtual assets across devices in a multi-user system.

Before further describing embodiments of the invention, it may be useful to define some related terms.

"Virtual reality", "VR", or "VR experience" may refer to a computer-generated environment that simulates aspects of physical reality and the manner in which human beings interact with it. This can include a three-dimensional rendering of virtual objects that mimic the appearance and characteristics of real-world objects. In one example, virtual reality may include a "virtual world" or "virtual spaces," rendered as 360 degree images that surround a user's view in all or substantially all directions. In these examples, a user may perceive the computer-generated environment as real or substantially life-like as a result of the computer modifying images, sounds, and other stimuli in the environment. These modifications can be executed by the computing device in response to user inputs, so that the user may perceive the VR experience as they do the real world. For example, head movements of the user can be tracked and used to render a different part of a 360 degree image or video, thus simulating for the user the real-world experience of surveying/observing his or her surroundings.

A "virtual reality device" or "VR device" may refer to a computing device used to render a VR experience. This may include a number of electronic devices and their constituent hardware and software elements. In some examples, this can include one or more output devices (e.g., displays) and one or more input devices. The display(s) can be incorporated as a headset worn over the eyes, and may be configured to give images a perceived three-dimensionality, such as by displaying different images to each eye of the user to provide depth (i.e. stereoscopic vision). As one example, a VR device may include a game console, a VR headset, and one or more gaming controllers. As another example, a VR device may include a mobile device, a headset, and one or more sensors, such as accelerometers, cameras, microphones, etc. A processor of the VR device can execute instructions for rendering the. VR experience, which can be stored on a computer-readable medium such as a local software application or external memory device. For example, the processor may be configured to execute computer code for a video game engine (VR engine) that runs the VR experience.

Figure 8:
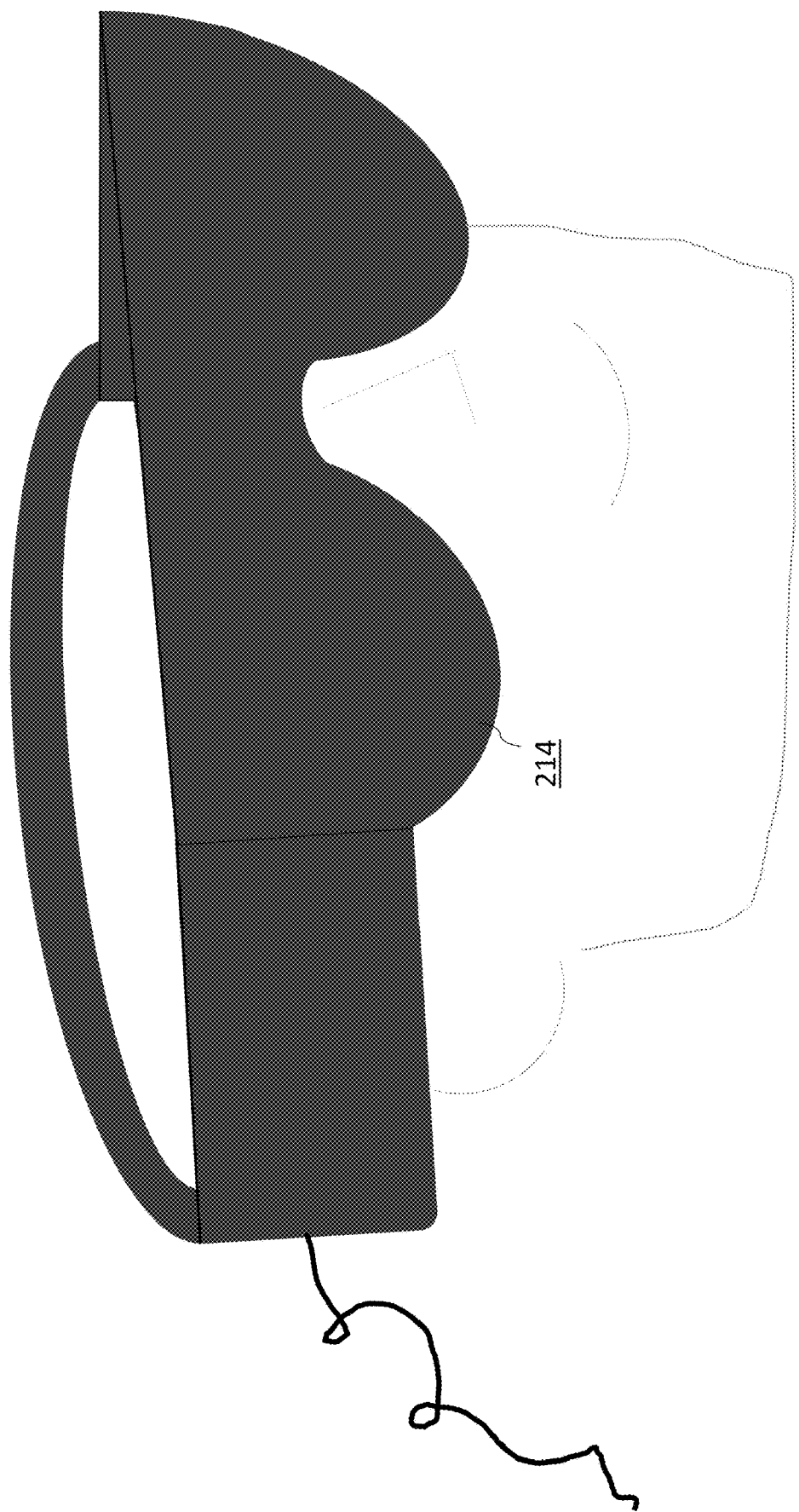
FIG. 8 depicts an illustration of a virtual reality device.
Figure 9:
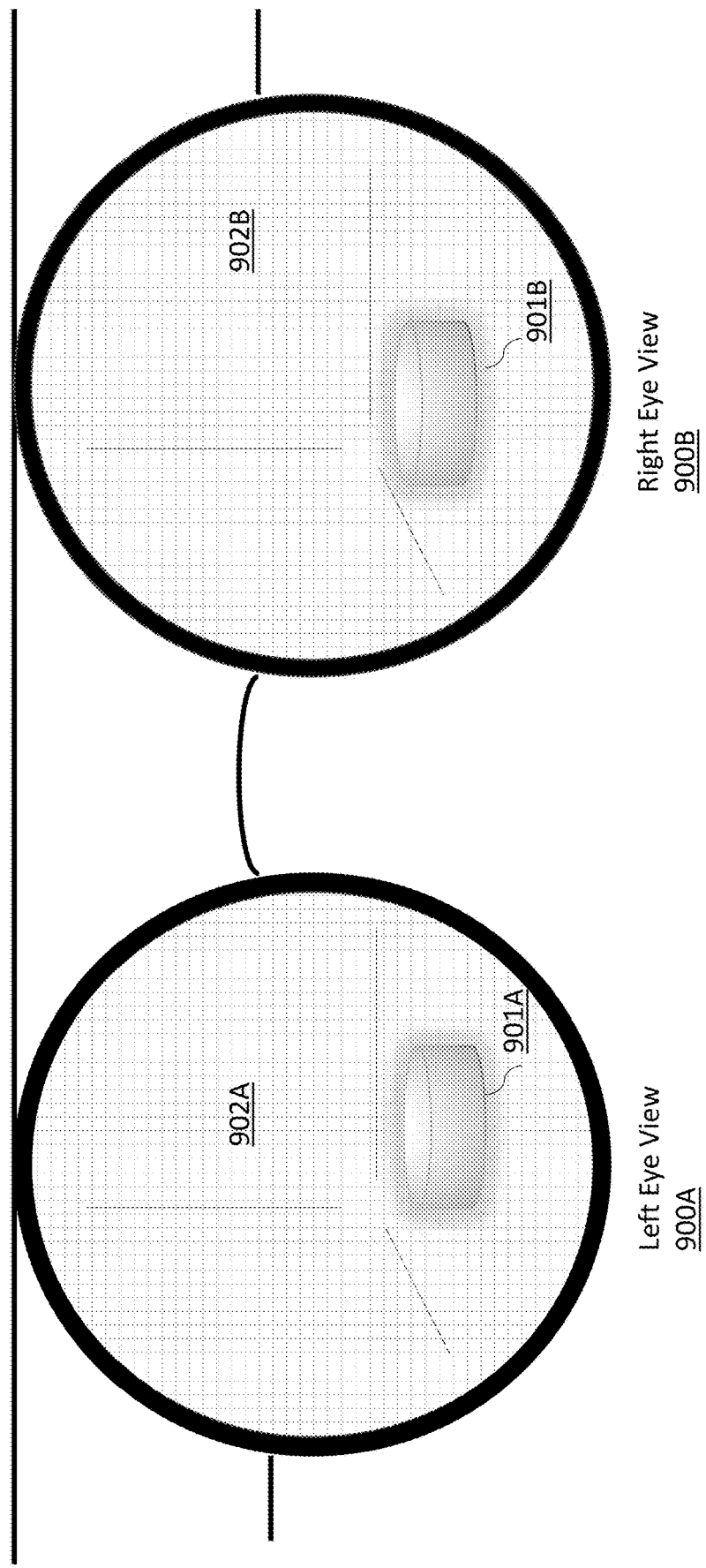
FIG. 9 shows an illustrative example of a set of views displayed by a VR device.

FIG. 8 depicts an illustration of a virtual reality device. As can be seen, a display device 214 covers the eyes of an operating user and directs images towards them. The display device 214 can include two separate displays for different views (left and right eye) in order to simulate depth and three-dimensionality. FIG. 9 shows an illustrative example of a set of views displayed by a VR device. From the left eye view 900A, an object 901A may have a certain position in a space 902A. The same object 901B may have a different position in the same space 902B as seen from the right eye view 900B. The resultant image when looking at these two views simultaneously may give the appearance of the object having depth and volume around these positions in space.

A "user device" may refer to a computing device operated by a user. User devices can include computing devices used to render a virtual reality or augmented reality experience. As such, VR devices and AR devices can be referred to as user devices.

"Augmented reality" or "AR" may refer to an experience that contains both real and virtual objects. For example, augmented reality may involve inserting and/or overlaying virtual objects in a camera view. The camera view can be provided by a camera of a user device, and virtual objects can be rendered into the camera view when displayed to the operating user.

A "virtual object" may refer to an object rendered in a VR or AR experience. A few examples of virtual objects include virtual furniture, virtual art, virtual representations of media content, virtual representations of a movie set, etc. A virtual object may include a set of image data that determines the appearance of the virtual object in a user's view. For example, the set of image data may comprise one or more images for an object as viewed from a different viewpoint or perspective (e.g., side, top, bottom, etc.). A virtual object may further comprise physical characteristic data. The physical characteristic data may be related to physical properties of the virtual object's real-world counterpart, and can be used to simulate these physical properties in the virtual world. For example, the virtual object may be associated with various light reflectance properties, material properties, sound and/or vibration properties, etc., which can be read as data by the VR engine to render an object exhibiting/simulating the contained properties. These characteristics or properties can be processed by a device as rendering data for how the virtual object will appear in a display.

A "restricted virtual object" may refer to a virtual object associated with some form of restricted use. The restricted use may include one or more conditions for how the restricted virtual object can be used or accessed in VR. The conditions can take the form of a set of permissions determined by a creator, producer, or distributor of the restricted virtual object or its real-world counterpart, so as to limit and protect its use. For example, the restricted virtual object may include a digital representation of copyrighted material, such as books, movies, music, artwork, etc., which may be associated with predefined terms of use.

An "item identifier" may refer to a name, label, or code that identifies an item. The name, label, or code can be a unique string of characters that identifies or is assigned to a specific virtual object or its real-world counterpart. For example, the item identifier may be a unique product code that identifies specific purchasable content in VR. As another example, an item identifier can simply be the title, author, and creation date for a piece of content. As such, an item identifier can be used, for the purpose of database query, so as to find and retrieve specific information about a particular item.

A "user identifier" may refer to a name, label, or code that identifies a person or user. For a VR experience, the name, label, or code can be a string of characters that identifies the user. As examples, a user identifier may be a user name or gamer tag, which can be associated with a unique user profile or gamer profile. The profile may be maintained at a database, and may be updated according to actions taken by or towards the associated user.

"Position data" may refer to coordinates or other reference data for determining a location. The location may be a virtual location in VR. For example, position data may identify a virtual space belonging to a particular user, and may further identify a particular location within the user's virtual space. In another example, the position data can further communicate the orientation of a virtual object, such as the object's pose within a given virtual space. Position data can also include data for a real-world physical location.

"Rendering" may refer to the process of generating an image by means of a computer program. For example, computer graphics can be used to portray an object in virtual form. This may include the use of color and shading to make a portrayed object appear solid and three-dimensional. In the context of video games and animation rendering may refer to the process of giving a model its final appearance through the application of visual effects, such as shading, texture-mapping, shadows, reflections, and motion-blurs.

A "rendering model" or "model" may refer to an outline or template for one or more images that are to be rendered. For example, a model may be a template for a virtual object that can be rendered in VR, and may contain certain size, shape, pose, and dimensional data. In some examples, light reflectance/scattering and shading characteristics can be applied to a model to give it its fully rendered appearance.

A "rendering location" may refer to a location where an image is to be rendered. This may be a virtual location in a virtual space of a user. For example, the rendering location can be a portion of a virtual room that a virtual object occupies and takes up space. In one example, the rendering location for a VR representation of a book could be on a virtual table top in the user's space. In another example, the rendering location for a digital movie could be a virtual wall in the user's space. In yet another example, the rendering location for a VR representation of art could be a virtual picture frame within the user's space. For augmented reality, a rendering location can be a real-world physical location as portrayed in a camera view.

"Content data" may refer to data representing or containing content. The content can be media content, video game content, written content, etc. For example, the content data can include one or more digital media files, such as text data, audio data, image data, video data, and/or 3-D object data.

A "media file" may refer to a computer file containing media content. This can include, but may not be limited to, one or more text, audio, image, video, and/or 3-D object files. This can further include, but may not be limited to, any media that is encoded in a machine-readable or digital format. For example, a digital media file can include any number of photo, music, or video files having a given digital media file format or "codec", such as JPEG, GIF, PNG, TIFF, BMP, AAC, MP3, WAV, WMA, DOLBY® DIGITAL, DTS, AIFF, ASF, FLAC, MPEG-1, MPEG-2, MPEG-4, AVI, MOV, AVCHD, H.264, H.265, MKV, RMVB, DivX and DivX HD, Xvid HD, MKV, RMVB, WMV9, etc. It should be understood that the listed digital media file formats are only examples, and any number of standard or non-standard file formats may herein apply.

A "request message" or "request" may refer to a message seeking a response. For example, the request may be a message sent from a client to a server in a client-server software architecture. The request can include data for a requested action to be taken by the server, and the response can include data for the requested action or an approval or denial thereof. As an example, a request can be a request to update and/or retrieve data from a database accessible by the server, and a response can be a confirmation from the server that the update has been performed or that the data has been retrieved (e.g., sending the retrieved data to the client).

An "icon" may refer to an image that represents an action or set of actions that a computer program can execute. The representative action may be executed by the computer program upon selection of the icon by a user. For example, an icon may be a graphical button that a user can select using an input command directed at the icon. In VR, the input command can be provided using any number of inputs available to the user, such as press buttons, voice commands, gaze pointing, etc.

A "wishlist" may refer to a list of items desired by a user. For example, a wishlist can be a list of purchasable items that a user would like to buy or have. A wishlist can be provided as a feature of an online store or virtual store interface. A user may be able to save a wishlist and its contained items, and may further share the wishlist with other users.

A "graphical user interface" (GUI) or "interface" may refer to a human-computer interface that allows a user to interact with a computer via graphical images. For example, the graphical images may include graphical icons selectable by the user. A GUI can take the form of any number of 2-D and/or 3-D objects.

A "graphics processing unit" or "GPU" may refer to a processor for executing display functions. This may include any number of programmable logic chips specially designed for the rendering of images, animations, and video on a computer screen or other device display device. A GPU can be used for a number of parallel computing operations, including the rendering of 3D objects and their corresponding motion. Some brief examples of GPUs may include Nvidia GeForce® GTX 1070, Nvidia GeForce® GTX 1080 Ti, AMD Radeon RX 560, AMD Radeon RX 580, etc.

Embodiments of the invention will now be described in further detail. FIG. 1 shows a system diagram of a multi-user system according to embodiments. As depicted, multi-user system 100 comprises one or more server(s) 120 communicating with a plurality of devices over a network 130. The plurality of devices may include first user device 111 operated by a first user 101, second user device 112 operated by a second user 102, and nth user device 113 operated by an nth user 103. It should be understood that any number of user devices (1 through N) can be connected over network 130. In one embodiment, the user devices may be virtual reality devices. In another embodiment, the user devices may be augmented reality devices.

In embodiments, network 130 may be any communication network through which devices can send and receive data, either over wired or wireless means. For example, network 130 may include means for connected over the internet, such as through a cellular network, Ethernet, WiFi, 3G, 4G, 5G, LTE, fiber optics, satellite communications, etc. As another example, network 130 can be a network for a particular area or small region, such as a local area network, personal area network, or any other communication means that can be implemented over short distances (e.g., Blutooth, UHF, RFID, NFC, etc.). It should be understood that embodiments are not limited to any particular communications protocol, but may be implemented over any number of communication protocols that may be typically used in the art, such as Internet protocol (IP) and the like.

According to embodiments, each user device (111, 112, 113) in the plurality of devices may send and receive game data to and from server(s) 120 over network 130. In one embodiment, one or more of the user devices can act as a server 120. Game data may include inputs from each of the users (101, 102, 103) as well as data for rendering a game state at each of the user devices (111, 112, 113). The game state may relate to the appearance and location of virtual objects in a virtual world, as well as a virtual appearance and location of each user in the virtual world. As an example, the game state may describe the appearance and location of virtual furniture and virtual art in a shared space, as well as the appearance and location of each user (101, 102, 103) in the space.

The server(s) 120 may be coupled to or have access to one or more databases. The databases may include content database 120A for storing data for content, such as media content, game content, and the like. The databases may further include account database 120B for storing user account data of first user 101, second user 102, nth user 103, etc. In one embodiment, content database 120A and account database 120B may be the same database. According to embodiments, some content of content database 120A may be restricted and may not be available to all users. Server(s) 120 may be configured to manage control over which accounts have permission to access particular restricted content and that have permission to fully render the restricted content at their device.

In embodiments, each user device (111, 112, 113) may comprise means for rendering a shared virtual space using received game data. For example, each user device may comprise executable instructions for a game engine, which can be used to process data for the position, motion, and appearance of virtual objects, so as to render an instance of the virtual world for its operating user. An exemplary user device (111, 112, 113) can be device 210 of FIG. 2, which shows a block diagram of a user device according to embodiments.

Figure 2:
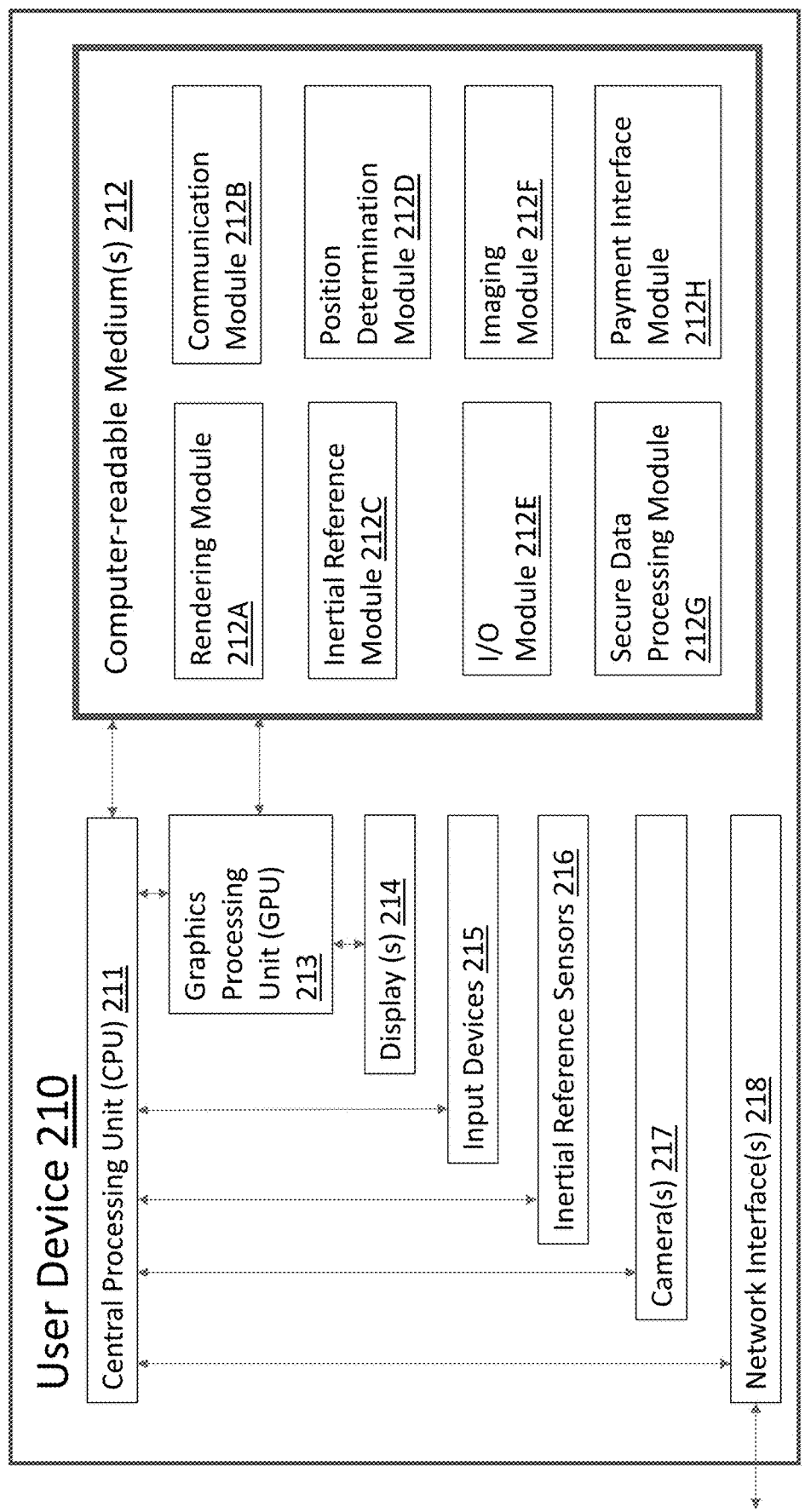
FIG. 2 shows a block diagram of a user device according to embodiments.

Looking at FIG. 2, device 210 may comprise a central processing unit (CPU) 211 for performing computations and executing instructions relating to a given task. The instructions may take the form of computer code stored in one or more computer-readable medium(s) 212. Computer-readable medium(s) 212 may comprise computer data storage, which may include one or more internal or external memory stores. For example, computer-readable medium(s) 212 may include random access memory (RAM), dynamic random access memory (DRAM), read-only memory (ROM), erasable programmable read-only memory (EPROM), flash memory, or any number of volatile and/or non-volatile memory. This may further include external memory stores provided by a number of storage media, such as hard disks, optical discs, magnetic tape, holographic memory, etc. Executable instructions can be stored in computer readable medium 212 as one or more modules of code, which in embodiments, may include rendering module 212A, communication module 212B, inertial reference module 212C, position determination module 212D, I/O module 212E, imaging module 212F, secure data processing module 212G, and payment interface module 212H, described in greater detail below.

Device 210 may further comprise one or more graphics processing units (GPU) 213, one or more display(s) 214, one or more input devices 215, one or more inertial reference sensors 216, one or more cameras 217, and one or more network interfaces 218. Network interface(s) 218 may include one more network interfaces for connecting device 210 to a network such as network 130 of FIG. 1.

In embodiments, GPU 213 can be any suitable processing units specialized for computer graphics generation known by those in the art. Display(s) 214 can be any number of electronic display devices for generating an image, such as light-emitting diode display (LED), organic light-emitting display (OLED), plasma, liquid crystal display (LCD), cathode ray tube, digital light processing (DLP), laser, etc.

In embodiments, the one or more input devices 215 may include any number of input devices for translating user commands to computable instructions, such as through voice inputs, touch inputs, motion inputs, etc. For example, the one or more input devices 215 may include one or more microphones, one or more press buttons, one or more game controller devices (e.g., joysticks, motion sensing controllers, etc.), and the like. In another example, the one or more input devices 215 may include display 214, such as in the case of a touchscreen. In yet another example, the one or more input devices can include camera(s) 217, such as in the case of gesture recognition. User inputs can be translated into computer executable instructions using each input device in input devices 215 or a combination of multiple input devices in input devices 215. For example, in the case of "gaze pointing" in VR, the input device may utilize both inertial reference sensors 216 for determining the direction of the user's gaze, as well as a press button for making a selection in the direction of the gaze.

In embodiments, inertial reference sensors 216 may comprise one or more sensors for detecting the position, orientation, and movement of device 210. For example, inertial reference sensors 216 may include accelerometers, magnetometers, global positioning modules, etc. The information received from these sensors can be used to detect where the user is looking, so that different images can be displayed in order to simulate real-world surveying of one's surroundings. In some embodiments, camera(s) 217 can be used to determine the position and orientation of device 210. For example, camera 217 can record image data of an operating user's environment, and image analysis techniques can be used to recognize one or more points of reference in the recorded image to anchor the position and orientation of the device 210. In embodiments, camera(s) 217 can include one or more standard visible light cameras but may also include IR cameras, depth cameras, etc.

As previously mentioned, computer-readable medium 212 may comprise a plurality of modules of executable instructions. Rendering module 212A may comprise instructions for rendering images on display 214. For example, rendering module can include code for processing rendering data into image data that display 214 can understand and output. Rendering data can include data for rendering a restricted virtual object based on a partially rendered model, where the partially rendered appearance of the virtual object can indicate a desired item by a first user to a second user. The partially rendered model may be such that it does not contain any restricted content. Rendering data can also include data for a fully rendered model of the restricted virtual object. Thus, rendering module 212A may further comprise instructions for applying rendering data to a partially rendered model located in a space, so as to generate a fully-rendered virtual object at the location. The rendering data for the fully rendered model can include light reflection, light scattering, shading, and/or color data needed to give a fully rendered appearance to restricted content data. As examples, the restricted content data can include copyrighted text, copyrighted audio, one or more copyrighted images, and/or one or more copyrighted videos.

Communication module 212B may comprise instructions for generating, formatting, sending, receiving, and reformatting data messages over network interface 218. This may include the communication of request messages to a server and receiving a response. In one embodiment, communication module 212 may include instructions for generating a request that comprises an item identifier for a desired item, sending the request to a server, and receiving a partially rendered model of the desired item from the server.

Inertial reference module 212C may comprise instructions for controlling and processing data from inertial reference sensors 216. This may include computer code for translating sensor data into a position, orientation, and motion of the user device 210. For example, sensor data from an accelerometer can be analyzed to determine how a VR device (and thus its operating user) is moving with respect to changes in direction in speed. As another example, sensor data from a magnetometer can be analyzed to determine which direction a VR device (i.e. the user) is facing.

Position determination module 212D may comprise instructions for determining position data for a location. The location can be the current location of a user device 210 or a location selected by a user of the user device 210. For example, a location can be a wall, table, floor, or other surface in a user's space. The position can include coordinates of the physical world or coordinates relative to a virtual world. In the case of virtual reality, position data may be determined based on game data. For example, the position data may be in reference to coordinates of a game level or map. In the case of augmented reality, position data can be determined based on sensor data e.g., GPS), by using computer vision techniques, or both. As one example, the global location of the user device 210 can be determined using GPS, while the location of the user device relative to its surroundings may be determined with reference to markers or features identified in a camera feed.

I/O module 212E may comprise instructions for controlling and processing data for the one or more input devices 215 of user device 210. I/O module 212E may also comprise instructions for controlling and processing data for one or more output devices. As one example, I/O module 212E may include instructions for processing audio data for both microphones and speakers of the user device 210. I/O module 212E may include instructions for processing selections made by a user via any number of provided methods of input, such as press buttons, joy sticks, voice commands, etc.

Imaging module 212F may comprise instructions for generating and analyzing image data from camera 217. This may include code for performing one or more image processing techniques. In one embodiment, the one or more image processing techniques may include techniques used for the purpose of augmented reality. For example, imaging module 212F may comprise code for performing a spatial mapping of a room.

Secure data processing module 212G may comprise instructions for securely processing sensitive data on device 210. This can include sensitive user account data. For example, the sensitive user account data can be payment information, user identifying information, and/or encryption keys.

Payment interface module 212H may comprise instructions for carrying out a payment process. The payment process may include a process for selecting a desired item on a wishlist of a first user as well as a process for buying a desired item on the wishlist of the first user by a second user. The payment interface module 212H may further comprise code for one or more graphical user interfaces and icons, such as those relating to a virtual store interface.

Figure 3:
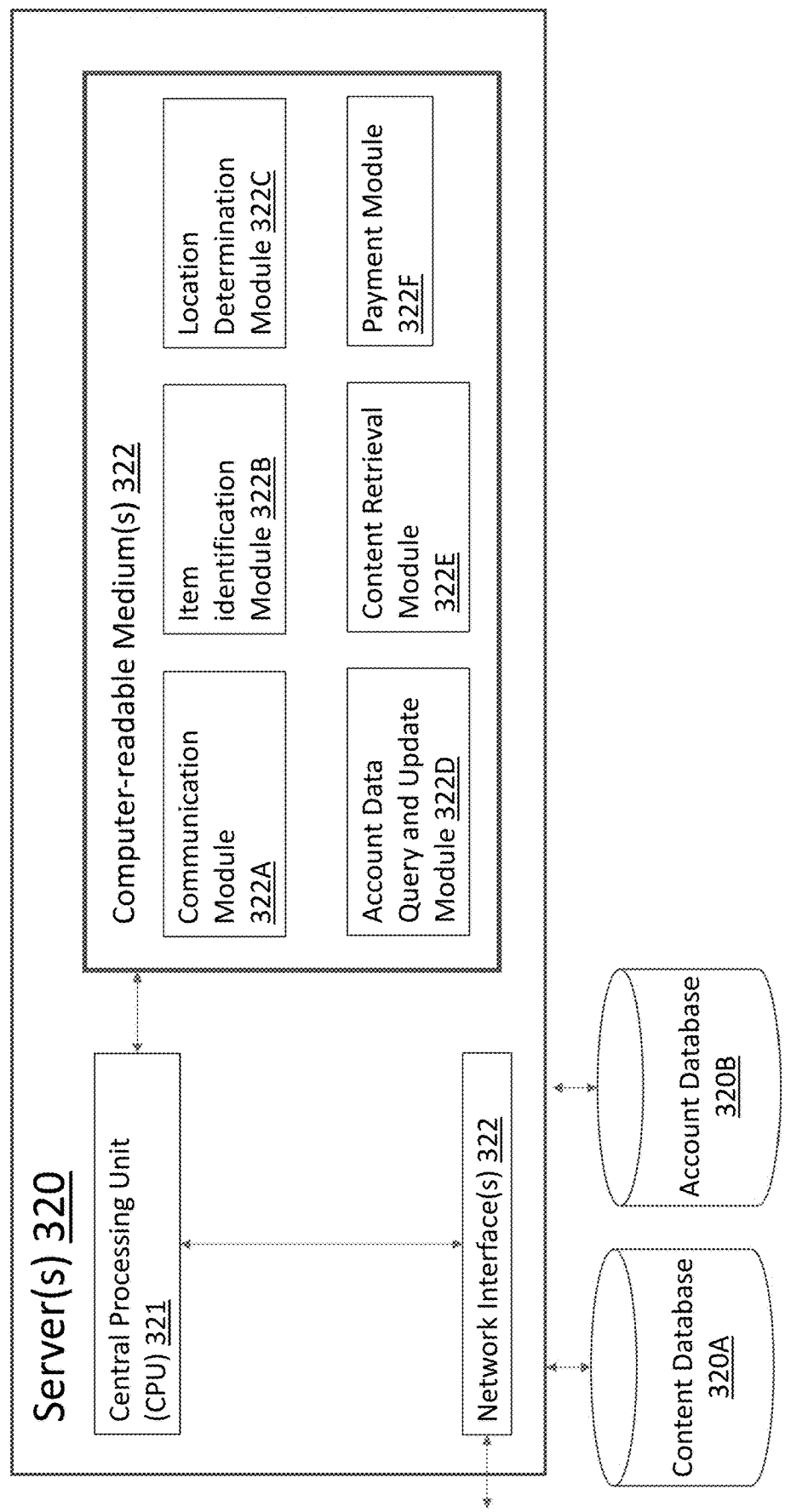
FIG. 3 shows a block diagram of an exemplary server according to embodiments.

FIG. 3 shows a block diagram of an exemplary server according to embodiments. Server 320 may comprise a central processing unit (CPU) 321, one or more network interfaces 322, and one or more computer-readable mediums comprising instructions in the form of executable modules of code. It should be understood that the functions of server 320 may be performed by one server or by multiple servers. For example, server(s) 320 may include several servers distributed across a network. The one or more server(s) 320 may further be coupled to or have access to a plurality of databases, such as content database 320A and account database 320B. Content database 320A may include one or more databases of content or pointers to the location of content. Account database 320B may include one or more databases for storing user account information and/or transactional information for transactions conducted by users. In one embodiment, account database may be a blockchain or other distributed database.

Computer-readable medium 322 may comprise a communication module 322A, an item identification module 322B, a location determination module 322C, an account data query and update module 322D, a content retrieval module 322E, and a payment module 322F.

Communication module 322A may comprise instructions for generating, formatting, sending, receiving, and re-formatting messages. The messages can be data messages sent over network interface(s) 322, including request and response messages communicated with user devices. The communication module 322A may include instructions for a receiving an indication of a desired item by a user of device. The indication may be a request to render a restricted virtual object in a space of the user. The request message may comprise an item identifier for the restricted virtual object, a user identifier of the user, and position data indicating the requested location that the restricted virtual object is to be rendered. Communication module 322A may further comprise instructions for sending a response message back to the user device. One type of response may include a partially rendered model and a determined rendering location within the space of a user. Communication module 322A can also include instructions for receiving a request to fully render a restricted virtual object. The request message can comprise a user identifier for a user, an item identifier for a restricted virtual object, and a rendering location. Communication module 322A can include instructions for sending a response that may include rendering data for the fully rendered model.

Item identification module 322B may comprise instructions for identifying an item and data associated therewith. For example, an item may be associated with a item number, product number, name, author, creator, date of creation, etc. In one embodiment, data associated with an item may include rendering data for rendering the item in a space of a user. The rendering data may include data for one or more rendering models, including partially and fully rendered models. In another embodiment, the data associated with an item may further include content data in the form of one or more media files. Identifying the data associated with an item may comprise querying one or more database using an item identifier. For example, identifying content data associated with a virtual object, such as audio and video content, may include querying content database 320A using a unique product code.

Location determination module 322C may comprise instructions for determining a location in space. The location may be a rendering location for rendering a virtual object. The rendering location can be a location in virtual space (such as in VR) or may be a location in physical space portrayed in a camera view (such as in AR). The location may be a global coordinate that is consistent across devices. For example, the global coordinate may be used as a reference by separate user devices to render a shared virtual world involving multiple users. A location may be determined based on position data received from a user device. For example, the position data may be coordinates within a user's virtual space, and the location can be determined by comparing the coordinates to a layout of the user's virtual space. As such, instructions for determining a location in space may comprise reading position data, determining a space associated with the position data, comparing the position data to a layout of the space, and identifying the location in the space based on the comparison.

Account data query and update module 322D may comprise instructions for querying and updating account data. This may include account data stored in account database 320B. In one embodiment, account data query and update module 322D may comprise instructions for linking in account database 320B a partially rendered model to a user identifier (e.g., user name) and to a rendering location, which may be a location in the space of the user where the model may be rendered. The instructions can further include querying the account database 320B using a rendering location, determining a restricted virtual object that is partially rendered at the rendering location, and linking a fully rendered model of the restricted virtual object to the rendering location.

Content retrieval module 322E may comprise instructions for retrieving content associated with an item. The content may include rendering data and media data. In one embodiment, the rendering data may include light reflection, light scattering, shading, and/or color data needed to give a fully rendered appearance to restricted content data of a restricted virtual object. The restricted virtual object may comprise a restricted digital media file including copyrighted text, copyrighted audio, one or more copyrighted images, and/or one or more copyrighted videos.

Payment module 322F may comprise instructions for carrying out a payment process. This may include providing a purchase interface, such as a virtual store. The virtual store may comprise icons, such as wishlist icons and 'buy' icons. The payment process may include receiving and processing payment from one user to buy an item for another user. The item may be a desired item on a user's wishlist.

Figure 4:
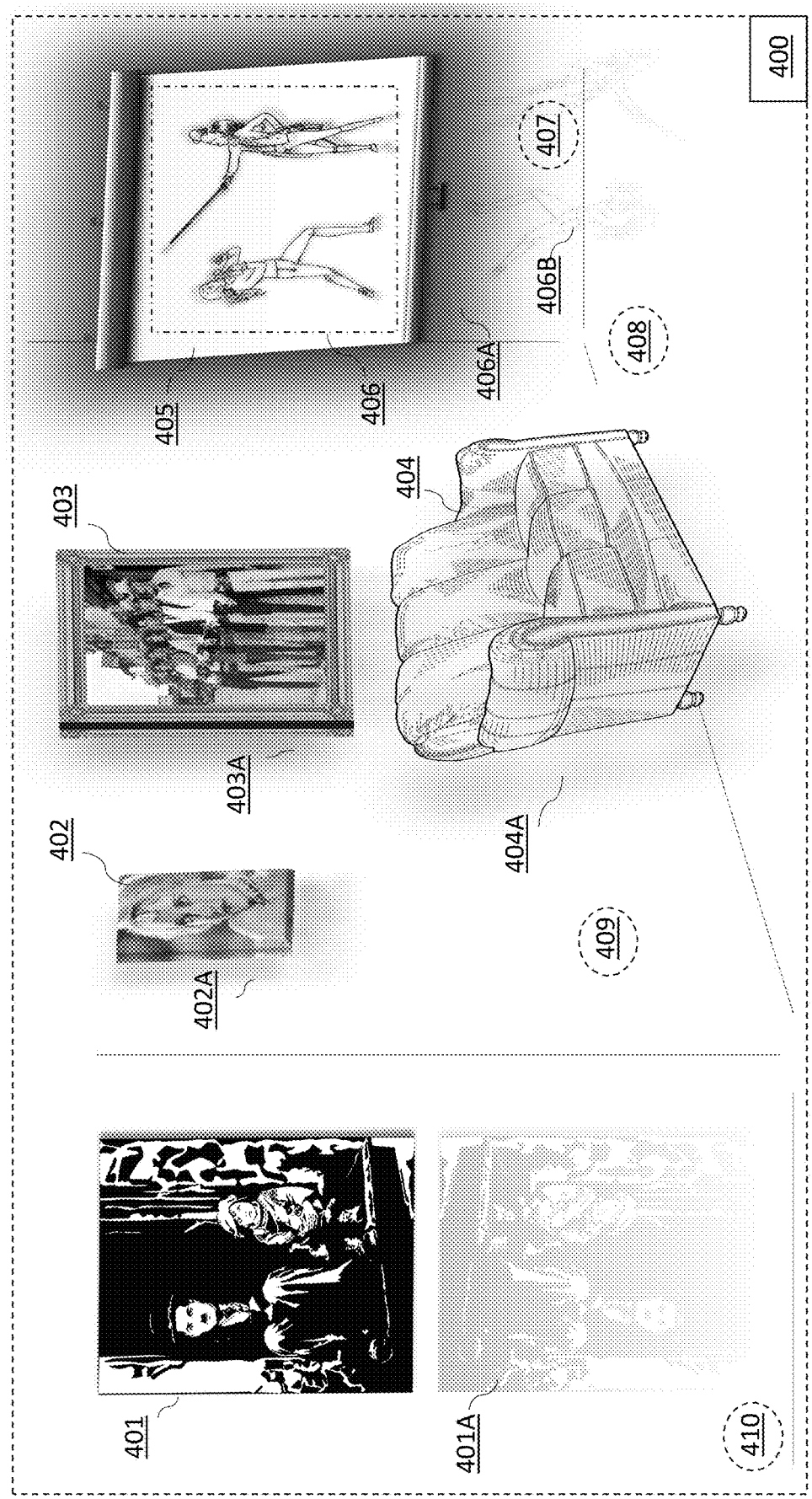
FIG. 4 shows an illustration of a space containing virtual assets according to an embodiment.

FIG. 4 shows an illustration of a space containing virtual assets according to an embodiment. Space 400 may be a virtual or physical area that virtual objects can be placed. In embodiments, when virtual objects are "placed" in a space, the virtual objects are rendered at a display of a user device in conjunction with the space. For example, in a virtual reality implementation, space 400 may be expressed as a set of images representing a virtual room surrounding the view of the user, and placing virtual objects in the space may correspond to rendering the virtual objects into the set of images. In another example, in an augmented reality implementation, space 400 may be expressed as a capture of a user's surroundings from a camera view, and placing virtual objects in the space may correspond to rendering the virtual objects into the camera view.

Space 400 may comprise a plurality of virtual objects 401, 402, 403, 404, 405, and 406, and may further comprise a plurality of surfaces 407, 408, 409, and 410. In embodiments, a virtual object can be placed onto or fixed to a surface. For example, object 401 may be fixed to wall 410, objects 402 and 403 may be fixed to wall 409, object 404 may be placed onto floor 408, and object 404 may be fixed to wall 407. In one implementation, the plurality of surfaces may be virtual surfaces having a virtual location and a set of virtual features, such as in the case of virtual reality. In another implementation, the plurality of surfaces may be physical surfaces having a real-world locations and a set of physical features, such as in the case of augmented reality.

In some embodiments, the surfaces can be surfaces of physical or virtual objects to which content data can be fixed to. For example, in the illustration shown in FIG. 4, object 406 may be a movie that is fixed to the surface object 405, which could be a real or virtual projection screen. As other examples, content such as animations and audio clips can be fixed to the surfaces of everyday objects such as a coffee mugs, coffee tables, magazines, books, sofas, cars, etc. In some implementations, such as in augmented reality, fixing content to a surface may include overlaying the content over a captured image of a physical item from a camera view. A particular physical item may be recognized using methods known in the art. For example, the physical item may be recognized from a camera view based on detected features or image patterns associated with the item. In embodiments, when a user device recognizes a physical item in view, it may identify the physical item as a rendering location and may determine virtual content associated with the rendering location that can be overlaid onto the image of the item in a display.

Each virtual object may be a virtual representation of a real and physical item or may be a virtual rendition of a type of item that has a real world counterpart. This may include virtual decorative items, virtual art, virtual promotional materials, virtual expressions of media content, etc. For example, object 401 may be a virtual movie poster, object 402 may be a virtual collectible item, object 403 may be a virtual art piece, object 405 may be a virtual piece of furniture, object 405 may be a virtual projector screen, and object 406 may be a virtual display of a movie. It should be understood, that although the objects depicted are shown in black and white, the objects may be rendered in color on a display. It should also be understood, that although the drawing of FIG. 4 is a 2-dimensional image, space 400 and its constituent objects may be displayed on a device as 3-dimensional using common techniques known to those in the art.

Each virtual object may have a set of rendering properties for how the object appears or is rendered to appear in a display of a user device. The rendering properties may include shadows, reflections, and other light reflectance and light scattering properties associated with the object and its interaction with other objects or surfaces. For example, as shown, object 401 may comprise reflection 401A made on surface 410. As other examples, object 402, 403, and 404 may comprise shadows 402A, 403A, and 404A respectively. In yet another example, object 406 may comprise light scattering 406A and 406B, which may include scattered light from visual content of object 406.

In embodiments, users can select items for placing in a space. The items may be provided by a graphical user interface, such as a virtual store interface or pop-up menu. For example, the interface may be a menu object that is rendered onto an imaginary plane within an area in front of the user's view. The items can be purchased by or for the user and associated with the user and/or a space of the user. As such, when users enter the space, the items can be rendered as virtual objects at their corresponding rendering locations.

In embodiments, virtual objects may be associated with restricted content and may be expressed as partially-rendered or fully-rendered models depending on if a user has permission to access the restricted content. The partially-rendered model may be a version of the item where restricted content is either absent or lacks sufficient rendering detail (e.g., indistinguishable rendering properties). In one embodiment the partially-tendered appearance of item may indicate a desired item or wishlist item of a first user to other users. The other users can choose to purchase the item for the first user, such that the fully-rendered model may be rendered at the rendering location in the space of the first user.

Figure 5C:
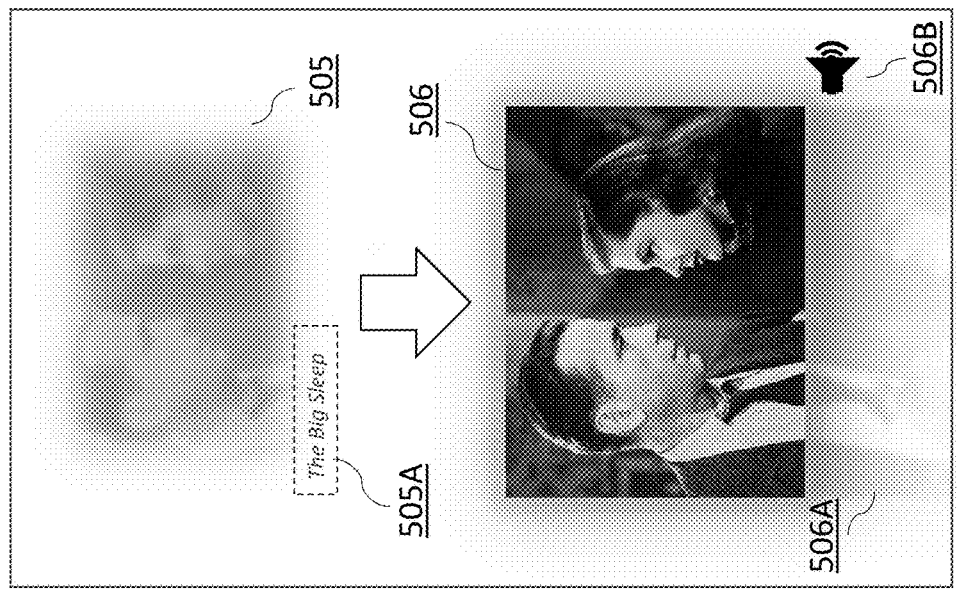
FIG. 5A, FIG. 5B, and FIG. 5C show an illustration of rendering models according to some embodiments.
Figure 5B:
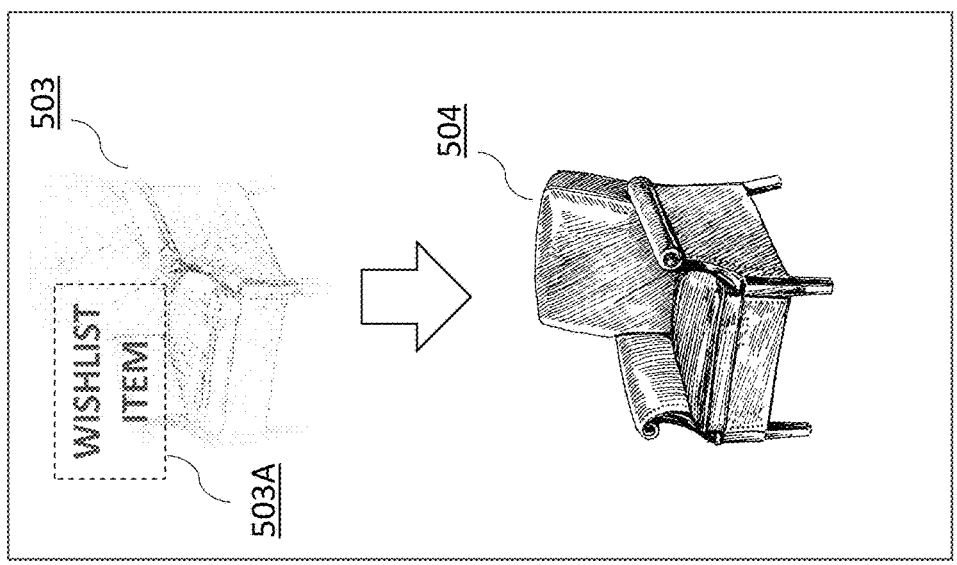
Figure 5A:
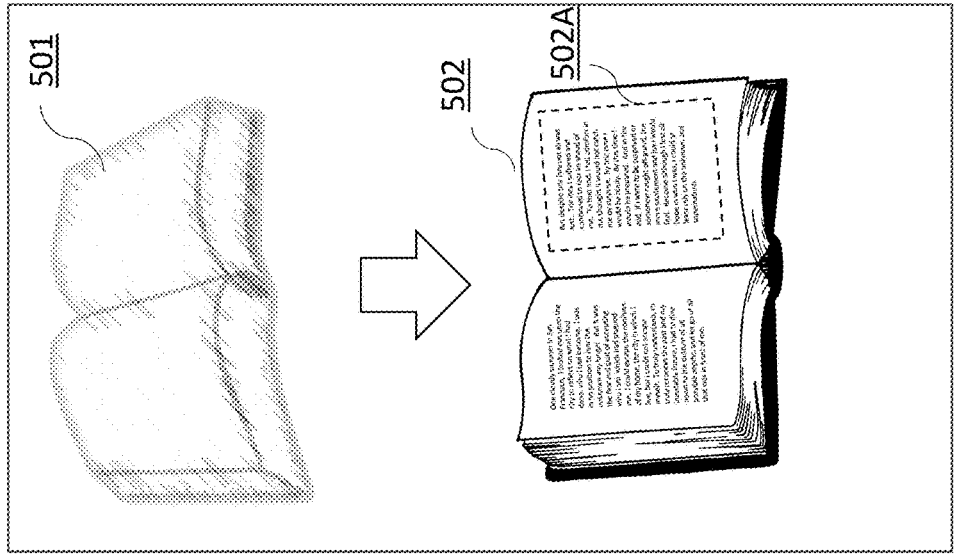

FIGS. 5A, 5B, and 5C show an illustration of rendering models according to some embodiments. The rendering models may be of virtual objects displayed on a device. In FIG. 5A, object 501 is depicted. Object 501 may have a partially rendered appearance of a book. The partially rendered appearance may be generated from a partially-rendered model of object 501, in which restricted content is absent or lacking sufficiently rendered detail. The restricted content can be copyrighted text, which may only be accessible when given permission by the content owner. A user can purchase the restricted content from the content owner to gain access. As mentioned, restricted content can be a desired item by a first user and can be purchased for the first user by a second user. Purchasing the desired item may then grant access to the restricted content at the rendering location.

Upon grant of access to the restricted content to the user, rendering data for a fully rendered model may be obtained. The rendering data may then be used to render a fully rendered version of the item, object 502. The fully-rendered appearance of object 502 may include the rendering of restricted content 502A at the rendering location and as a part of the item. The restricted content 502A may be, for example, copyrighted text for a book that the user added to their wishlist or reading list.

In FIG. 5B, an object 503 is depicted. Object 503 may be a virtual piece of furniture that is assigned to a particular rendering location in the space of the user. As shown, the object 503 may have a partially rendered appearance, indicating a desired item by a first user. The object 503 may further be marked by an icon 503A, identifying the object as a wishlist item on a wishlist of the first user. In embodiments, a second user may render the object 503 at his or her device when entering the space of the first user. The second user can purchase the item for the first user, such that a fully-rendered model of the object 504 may be rendered at the location.

In FIG. 5C, an object 505 is depicted, which may be a virtual representation of a movie, video, or other audio-visual content. The object 505 may include an item identifier 505A that uniquely identifies the item/object. For example, the item identifier 505A may be a movie title. The Object 505 may be associated with restricted content, which may require permission to access. As such, object 505 may have a partially-rendered appearance in which the restricted content is not available or given sufficient rendering detail. For example, the visual content for the item may be indistinguishable and/or audio content may be missing. In one implementation, a movie poster, trailer, or other form of preview may be provided in lieu of the restricted content, A second user can purchase the item for a first user such that a fully-rendered object 506 can be presented at the particular rendering location. Object 506 may contain the necessary rendering properties 506A and audio data 506B for distinguishing the item and consuming the restricted content.

Figure 6:
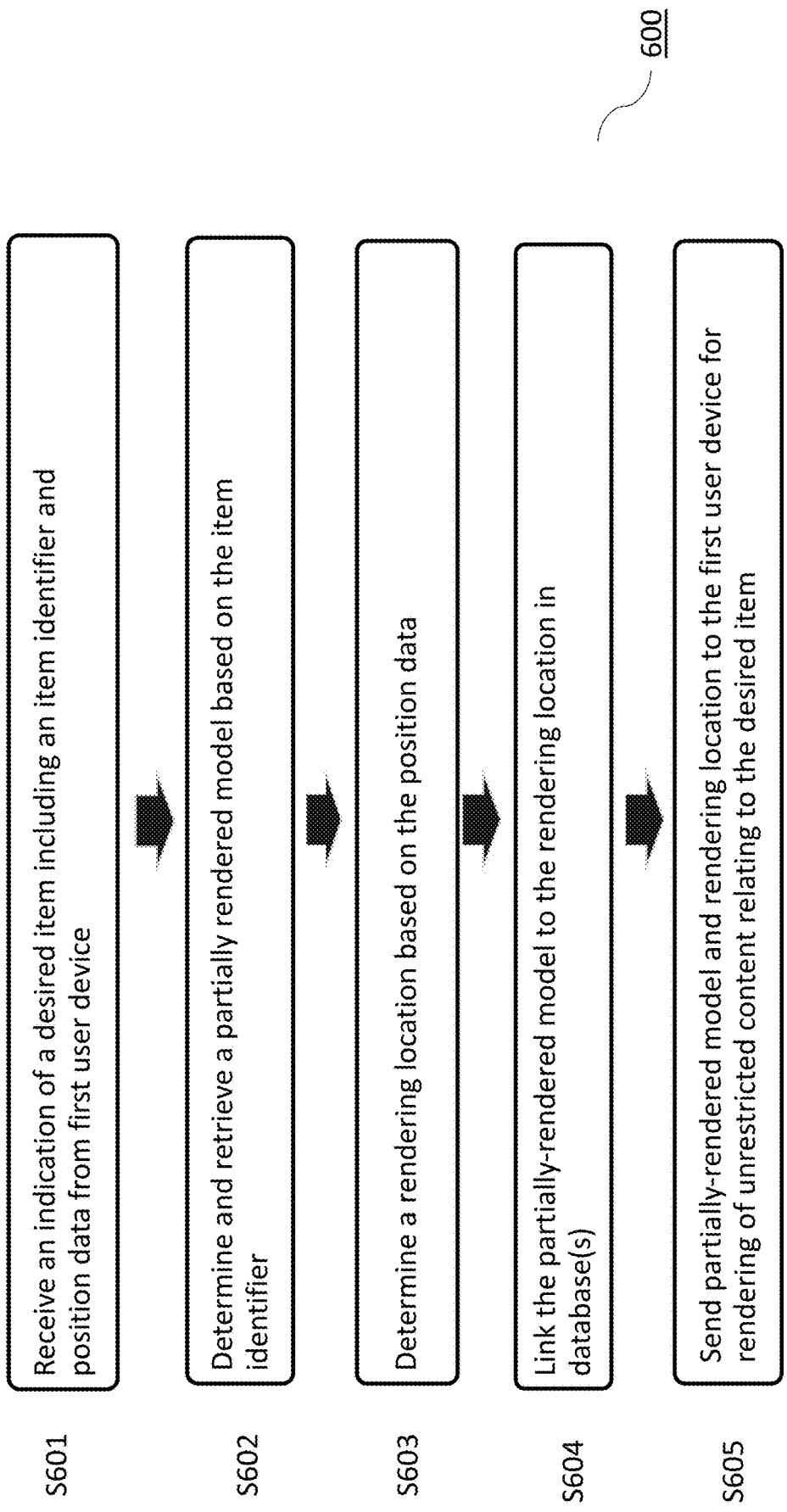
FIG. 6 shows a flowchart for a method of rendering a virtual asset in a multi-user system according to an embodiment.

FIG. 6 shows a flowchart for a method of rendering a virtual asset in a multi-user system according to an embodiment. Method 600 includes steps S601, S602, S602, S603, S604, S605. The method may be performed by a server, such as server 120 FIG. 1 or server 320 of FIG. 3.

In step S601, a server receives an indication of a desired item from a first user device. The indication can include an item identifier for the item and position data. In one embodiment, the indication can take the form of a data message containing the name or product code of an item as well as coordinates for where the item should be provided in a space. For example, fields in the data message could include 'item: serial no. 1193U2093' and 'position: space 3; surface 1; x=13.235923, y=923.23509, z=239.2353590'.

In step S602, the server determines and retrieves a partially rendered model based on the item identifier. For example, the server may query a content database for 'item: serial no. 119302093' which may be linked to 'model no. 235'. The server can then retrieve 'model no. 235' and its associated rendering data using information from the content database.

In step S603, the server determines a rendering location based on the position data. For example, from position data 'position: space 3; surface 1; x=13.235923, y=923.23509, z=239.2353590' the server can assign as a rendering location an area or volume of space that is centered around the given coordinates. For example, the rendering location can be designated as, 'space 3; x1=12, x2=14, y1=900, y2=950, z1=200, z2=280'. The orientation for rendering the object can also be specified (e.g., facing=Northeast').

In step S604, the server links the partially-rendered model to the rendering location in one or more databases. For example, the model can be associated with the rendering location in user profile data stored in an account database (user 1; space 3; x1=12, x2=14, y1=900, y2=950, z1=200, z2=280). The user can also make updates to the rendering location for the partially-rendered model such as its position and orientation in the space. These updates can be sent to the server, which may update account data accordingly.

In step S605, the partially-rendered model and rendering location can be sent to the first user device. The first user device can receive this information and use it to render the desired item at the rendering location. The partially-rendered model may be a model that only contains unrestricted content (e.g., freely available content). When a second user enters the space, their user device will similarly render the partially rendered model of the item at the rendering location. The partially rendered appearance of the item may indicate to the second user that the item is desired by the first user. The second user can choose to purchase a fully-rendered model of the item for the first user, which can be rendered at each of their devices. The users can then enjoy the restricted content in the space of the first user.

Figure 7:
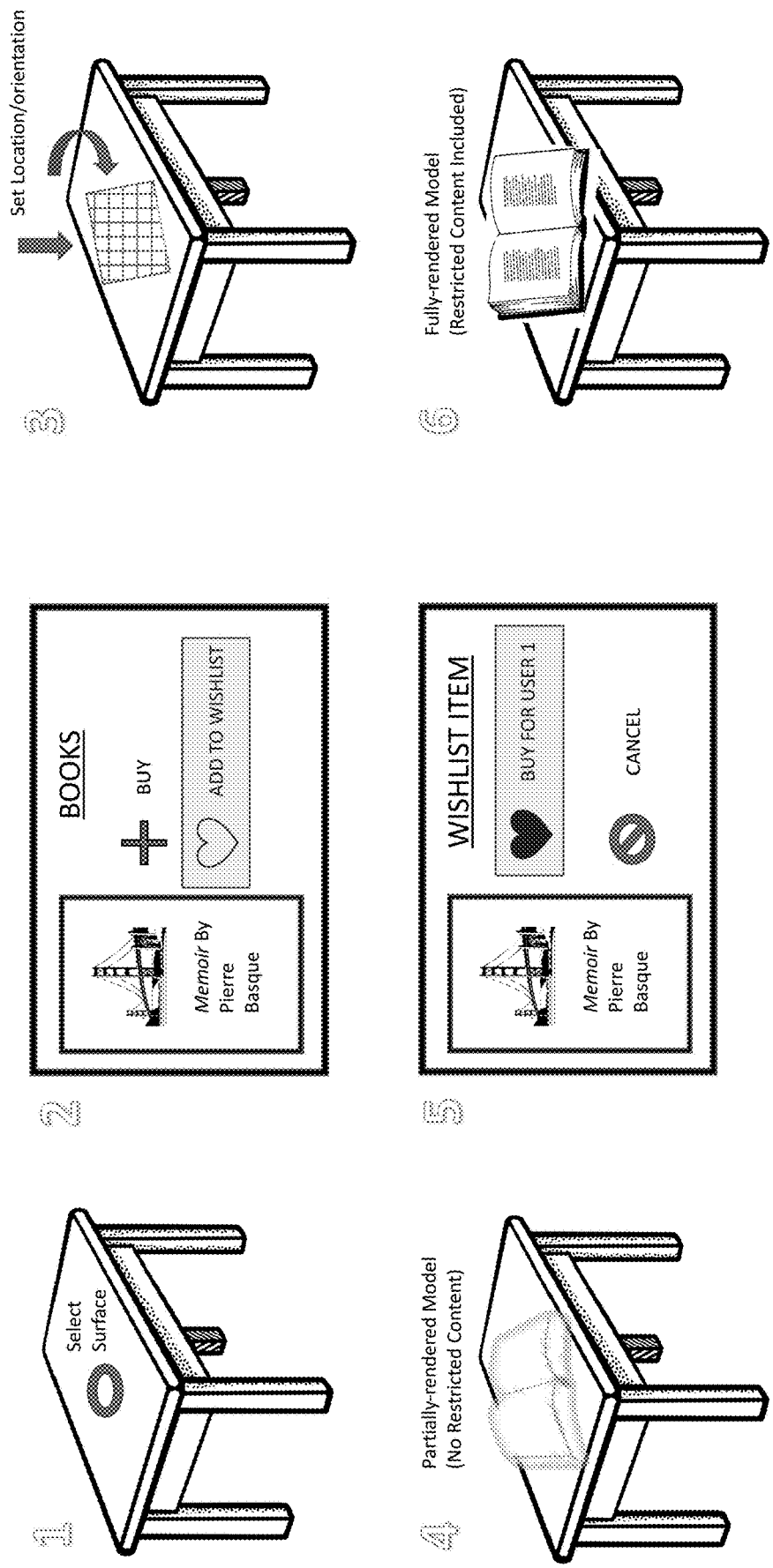
FIG. 7 illustrates a process of using a graphical user interface to render virtual assets in a space.

FIG. 7 illustrates a process of using a graphical user interface to render virtual assets in a space. In step 1, a surface is selected by a user. For example, the surface may be the top of a table that a user selects using gaze pointing. In step 2, the user selects an item and indicates that he or she would like to add the item to his or her wishlist. The user can make these selections from a virtual store interface that is provided to the user. For example, the interface can be a flat menu that is rendered in front of the user's view. The menu may include options for selecting a particular item for purchase, as well as adding the particular item to the user's wishlist.

In step 3, the user can preview an object model and set/update its location and orientation on the selected surface. In step 4, a partially-rendered model is sent to the user device and rendered at the set location. The partially-rendered model can be a model of the wishlist item in which restricted content is either absent or indistinguishable. The partially-rendered model can similarly be rendered at other devices when an operating user enters the space of the first user. For example, a second and third user can enter the space of the first user and their devices will render content contained therein.

In step 5, a second user chooses to buy the wishlist item for the first user. Again, these options can provided in a virtual store interface, such as a menu-style window rendered in front of the second user's view. In step 6, rendering data for the fully-rendered model is provided, and the restricted content is available at the rendering location for consumption by users in the space.

As used herein, the term module may describe a given unit of functionality that may be performed in accordance with one or more embodiments of the present application. As used herein, a module may be implemented utilizing any form of hardware, software, or a combination thereof. For example, one or more processors, controllers, ASICs, PLAs, PALs, CPLDs, FPGAs, logical components, software routines, or other mechanisms may be implemented to make up a module. In implementation, the various modules described herein may be implemented as discrete modules or the functions and features described may be shared in part or in total among one or more modules. In other words, as would be apparent to one of ordinary skill in the art after reading this description, the various features and functionality described herein may be implemented in any given application and may be implemented in one or more separate or shared modules in various combinations and permutations. Even though various features or elements of functionality may be individually described or claimed as separate modules, one of ordinary skill in the art will understand upon studying the present disclosure that these features and functionality may be shared among one or more common software and hardware elements, and such description shall not require or imply that separate hardware or software components are used to implement such features or functionality.

Where components or modules of the application are implemented in whole or in part using software, in embodiments, these software elements may be implemented to operate with a computing or processing module capable of carrying out the functionality described with respect thereto.

In this document, the terms "computer program medium" and "computer usable medium" are used to generally refer to transitory or non-transitory media such as. These and other various forms of computer program media or computer usable media may be involved in carrying one or more sequences of one or more instructions to a processing device for execution. Such instructions embodied on the medium are generally referred to as "computer program code" or a "computer program product" (which may be grouped in the form of computer programs or other groupings). When executed, such instructions may enable the computing module or a processor to perform features or functions of the present application as discussed herein.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects, and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide illustrative instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed in multiple groupings or packages or across multiple locations.

Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. A computer-implemented method comprising:
   receiving, from a first device operated by a first user, an indication of a desired item desired by the first user, the indication requesting a rendering of a restricted virtual object in a space of the first user and comprising an item identifier for the restricted virtual object, a first user identifier for the first user, and position data indicating a requested location in which the restricted virtual object is to be rendered;
   determining and retrieving, based on the indication and the item identifier, a partially rendered model of the restricted virtual object, wherein the partially rendered model comprises the item identifier for the restricted virtual object and a selection icon for initiating a request to fully render the restricted virtual object;
   determining, based on the position data, a rendering location in the space of the first user;
   linking, in one or more databases, the partially rendered model to the first user identifier for the first user and to the rendering location in the space of the first user;
   sending, the partially rendered model and the rendering location to the first device and to a second device operated by a second user, wherein the first device renders the partially rendered model at the rendering location, wherein the partially rendered model of the restricted virtual object is rendered at the rendering location by the second device operated by the second user, wherein a partially rendered appearance of the restricted virtual object indicates to the second user the desired item desired by the first user;

receiving from the second device, the request to fully render the restricted virtual object, the request comprising a second user identifier for the second user, the item identifier for the restricted virtual object, and the rendering location;

querying the one or more databases for the rendering location;

determining a fully rendered model of the restricted virtual object based on the item identifier and the rendering location;

linking, in the one or more databases, the fully rendered model to the rendering location; and sending rendering data for the fully rendered model to the first device, wherein the first device renders the fully rendered model of the restricted virtual object at the rendering location using the rendering data.

2. The method of claim 1, wherein the rendering data for the fully rendered model comprises light reflection, light scattering, and shading data.

3. The method of claim 1, wherein the rendering data for the fully rendered model comprises color data.

4. The method of claim 1, wherein the rendering data for the fully rendered model is needed to give a fully rendered appearance to restricted content data of the restricted virtual object at the rendering location.

5. The method of claim 1, wherein the fully rendered model of the restricted virtual object contains restricted content data, and wherein the partially rendered model does not contain restricted content data.

6. The method of claim 5, wherein the restricted content data contains a restricted digital media file comprising one or more of: copyright text, copyrighted audio, one or more copyrighted images, or one or more copyrighted videos.

7. The method of claim 1, wherein the indication of the desired item is represented by a wishlist icon in a virtual store interface rendered at the first device.

8. The method of claim 1, wherein the selection icon to initiate the request to fully render the restricted virtual object is a purchase icon to initiate a purchase process with the second user.

9. The method of claim 1, wherein the one or more databases comprises a blockchain.

10. The method of claim 1, wherein the fully rendered model of the restricted virtual object is rendered at the rendering location by a third device of a third user.

11. A server comprising:
processing circuitry;
a network interface; and
a non-transitory storage medium, the storage medium including code that, when executed by the processing circuitry, causes the server to perform a method, the method comprising:
receiving, from a first device operated by a first user, an indication of a desired item desired by the first user, the indication requesting a rendering of a restricted virtual object in a space of the first user and comprising an item identifier for the restricted virtual object, a first user identifier for the first user, and position data indicating a requested location in which the restricted virtual object is to be rendered;

determining and retrieving, based on the indication and the item identifier, a partially rendered model of the restricted virtual object, wherein the partially rendered model comprises the item identifier for the restricted virtual object and a selection icon for initiating a request to fully render the restricted virtual object;

determining, based on the position data, a rendering location in the space of the first user;

linking, in one or more databases, the partially rendered model to the first user identifier for the first user and to the rendering location in the space of the first user;

sending, the partially gendered model and the rendering location to the first device and to a second device operated by a second user, wherein the first device renders the partially rendered model at the rendering location, wherein the partially rendered model is rendered at the rendering location by the second device operated by the second user, and wherein a partially rendered appearance of the restricted virtual object indicates to the second user the desired item desired by the first user;

receiving, from the second device, the request to fully render the restricted virtual object the request comprising a second user identifier for the second user, the item identifier for the restricted virtual object, and the rendering location:

querying the one or more databases for the rendering location;

determining a fully rendered model of the restricted virtual object based on the item identifier and the rendering location;

linking, in the one or more databases, the fully rendered model to the rendering location; and sending rendering data for the fully rendered model to the first device, wherein the first device renders the fully rendered model of the restricted virtual object at the rendering location using the rendering data.

12. The server of claim 11 wherein the rendering data for the fully rendered model includes light reflection, light scattering, and shading data.

13. The server of claim 11, wherein the rendering data for the fully rendered model includes color data.

14. The server of claim 1, wherein the rendering data for the fully rendered model is needed to give a fully rendered appearance to restricted content data of the restricted virtual object at the rendering location.

15. The server of claim 1, wherein the fully rendered model of the restricted virtual object contains restricted content data, and wherein the partially rendered model does not contain restricted content data.

16. The server of claim 15, wherein the restricted content data contains a restricted digital media file comprising one or more of: copyrighted text, copyrighted audio, one or more copyrighted images, or one or more copyrighted videos.

17. The server of claim 11, wherein the one or more databases comprises a blockchain.

18. A non-transitory computer-readable medium having instructions stored thereon that, upon execution by one or more processors of a user device, cause the user device to carry out functions comprising:

displaying, to a user operating the user device, a virtual reality or augmented reality space of the user;

generating a preview of a restricted virtual object at a requested location in the virtual reality or augmented reality space of the user;

receiving an indication that the restricted virtual object is associated with a desired item desired by the user, the desired item comprising a media file executable by the user device and viewable in the virtual reality or augmented reality space of the user;

retrieving an item identifier for the desired item;

determining position data based on the requested location in the virtual reality or augmented reality space, the position data being fixed coordinates within the virtual reality or the augmented reality space;

generating a request comprising the item identifier, the position data, and a user identifier of the user, sending the request to a server;

receiving, from the server, a partially rendered model of the restricted virtual object, the partially rendered model of the restricted virtual object being a version of the restricted virtual object in which the desired item is omitted;

rendering the restricted virtual object based on the partially rendered model, the restricted virtual object having a partially rendered appearance indicating the desired item by the user;

receiving from the server, rendering data for a fully rendered model of the restricted virtual object, the fully rendered model of the restricted virtual object being a version of the restricted virtual object that contains the desired item comprising the media file;

rendering the fully rendered model at the fixed coordinates;

executing the media file; and rendering a display of the executed media file at the requested location in the augmented reality or virtual reality space.

19. The non-transitory computer-readable medium of claim 18, wherein the media file is a text file comprising literature that is subject to content restrictions, and wherein the literature that is subject to copyright restrictions is viewable within a location of the restricted virtual object in the virtual reality or augmented reality space when the text file is executed by the user device.

20. The non-transitory computer-readable medium of claim 18, wherein the media file is a video file comprising video content that is subject to copyright restrictions, and wherein the video content that is subject to copyright restrictions is viewable within a location of the restricted virtual object in the virtual reality or augmented reality space when the video file is executed by the user device.

* * * * *